United States Patent
Cheek et al.

(10) Patent No.: US 12,045,261 B2
(45) Date of Patent: Jul. 23, 2024

(54) METHOD AND APPARATUS FOR MEASURING MATERIAL RISK IN A DATA SET

(71) Applicant: MindBridge, Ottawa (CA)

(72) Inventors: Danielle Supkis Cheek, Houston, TX (US); Michael James Bottala, Monrovia, CA (US)

(73) Assignee: MindBridge (CA)

( * ) Notice: Subject to any disclaimer, the term of this patent is extended or adjusted under 35 U.S.C. 154(b) by 229 days.

(21) Appl. No.: 17/830,954

(22) Filed: Jun. 2, 2022

(65) Prior Publication Data

US 2023/0394069 A1    Dec. 7, 2023

(51) Int. Cl.
  *G06F 16/00*   (2019.01)
  *G06F 16/28*   (2019.01)
  *G06T 9/00*    (2006.01)

(52) U.S. Cl.
  CPC ............ *G06F 16/285* (2019.01); *G06T 9/001* (2013.01)

(58) Field of Classification Search
  CPC .................................................... G06F 16/285
  USPC .......................................................... 707/737
  See application file for complete search history.

(56) References Cited

U.S. PATENT DOCUMENTS

| 8,892,409 | B2 * | 11/2014 | Mun | G06Q 40/06 703/2 |
| 2022/0198562 | A1 * | 6/2022 | Cella | G06Q 40/04 |
| 2022/0366494 | A1 * | 11/2022 | Cella | H04L 9/50 |

* cited by examiner

*Primary Examiner* — Alexandria Y Bromell
(74) *Attorney, Agent, or Firm* — McDonnell Boehnen Hulbert & Berghoff LLP (57) ABSTRACT

The present invention provides a method including receiving a data set for an entity including data associated with criterions. Each of the data entries is grouped into a grouping. Then generating an error probability for the grouping. The error probability includes an ensemble of algorithms that each provide an indication of a potential error within the grouping. Also, generating a flow metric for the grouping by evaluating a magnitude of values for the data entries of the grouping. Then determining a materiality factor for each grouping using the flow metric for the grouping, a planned materiality threshold, and a performance materiality and generating a risk of material error for the grouping using the error probability and the materiality factor of the grouping. Also, highlighting a grouping within the data set based on the risk of material error of the grouping.

18 Claims, 4 Drawing Sheets

$$RMM = Error\ Probability \times \left(\frac{Flow\ metric}{Planning\ Materiality}\right)^{Transaction\ Factor}$$

FIG. 3a $$RMM = Average\left(IR, CR, (Error\ Probability) \times \left(\frac{Flow\ metric}{Planning\ Materiality}\right)^{Transaction\ Factor}\right)$$

METHOD AND APPARATUS FOR MEASURING MATERIAL RISK IN A DATA SET

CROSS-REFERENCE TO RELATED APPLICATIONS

This is the first application filed for the present invention.

FIELD OF THE INVENTION

The present invention pertains to the field of financial auditing and in particular to the use of software to produce a risk assessment to aid and guide auditors performing a financial audit.

BACKGROUND

Risk assessment is the foundation of a financial audit and is a driving factor that determines the nature, timing, and extent of audit procedures. Auditors perform procedures to obtain an understanding of an entity and its environment, including the company's internal controls, to identify and assess the risks of material misstatement of the financial statements, whether due to fraud, error, or other cause. The procedures usually include inquiries with management and other selected employees, knowledge of the industry, history of the client, analytical procedures, the auditor's personal experience, and observations of controls in operation. Auditors tend to lean heavily into qualitative approaches to assess risk because of a lack of data that has historically been available during this phase of an engagement.

Due to historic limitations in computing power and the sophistication of algorithms the extent of many firms' analytical procedures are often limited to year over year changes in the financial statements or trial balance and they have been unable to perform analysis at the transaction level. During an audit, this limited information may be limited to use a qualitative approach to estimate a risk of material misstatement (RMM) based on a simple risk model which may be inadequate and inefficient in cases.

Therefore, there is a need for improved methods that obviate or mitigate one or more limitations of the prior art, for example by providing a quantitative approach to estimating RMM to enhance existing qualitative approaches.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a risk of material misstatement method including receiving a data set for an entity where the data set includes a plurality of data entries including values associated with a plurality of criterions and each of the data entries is grouped into one of a plurality of groupings. Also, generating an error probability for each of the groupings by analysing the data entries within each of the groupings. The error probability includes an ensemble of algorithms that each provide an indication of a potential error within the particular grouping. Then generating a flow metric for each grouping by evaluating a magnitude of values within at least one of the criterions for the data entries of each grouping, and determining a materiality factor for each grouping using the flow metric for the particular grouping, a planned materiality threshold, and a performance materiality. Also, generating a risk of material error for each of the groupings using the error probability of the particular one of the groupings and the materiality factor for the particular one of the groupings. Then highlighting one or more of the groupings within the data set based on the risk of material error of the plurality of groupings being above a predetermined threshold.

Further embodiments include generating a visual rendition of the groupings that are highlighted.

In further embodiments, the highlighted group is obtained through a technique including one of sorting based on the risk of material error for each of the groupings, filtering, colouring, or other formatting, or receiving a click through a user interface.

Further embodiments include conducting further analysis on data entries within groupings that are highlighted.

In further embodiments, the materiality factor is a ratio of the flow metric and the planned materiality threshold raised to the power of one minus the performance materiality.

In further embodiments, the risk of material error is the error probability scaled by the materiality factor.

In further embodiments, the risk of material error is an average of the error probability scaled by the materiality factor, a control risk of the particular one of the groupings, and the inherent risk of the particular one of the groupings.

In further embodiments, the error probability is a quantitative value calculated based on individual error probabilities of each of the data entries within the particular grouping.

In further embodiments, the data set is a general ledger, and the plurality of groupings are financial accounts.

In accordance with another aspect of the present invention, there is provided a computer implement method including receiving a general ledger for an entity where the general ledger includes a plurality of data entries associated with a plurality of accounts. Also, generating a risk of misstatement value for each of the accounts by analysing the data entries within each of the accounts. The risk of misstatement value includes an ensemble of control points that each provide an indication of potential risk of misstatement within the particular account. Also, determining a total of monetary flow within each of the accounts and determining a materiality factor for each account using the total of monetary flows within the particular account, a planned materiality threshold for the entity, and a performance materiality. Then generating a risk of material misstatement value for each of the accounts using the risk of misstatement of the particular one of the accounts and the materiality factor for the particular one of the accounts.

In further embodiments, the materiality factor is a ratio of the total of monetary flows within the particular account and the planned materiality threshold for the entity raised to the power of one minus the performance materiality.

In further embodiments, the risk of material misstatement value for each of the accounts is the risk of misstatement of the particular one of the accounts multiplied by the materiality factor for the particular one of the accounts.

In further embodiments, the risk of material misstatement value for each of the accounts is an average of the risk of misstatement of the particular one of the accounts multiplied by the materiality factor for the particular one of the accounts, a control risk for the particular one of the accounts, and the inherent risk for the particular one of the accounts.

In further embodiments, the error probability is a quantitative value calculated based on individual error probabilities of each of the data entries within the particular grouping.

Embodiments further include highlighting one or more of the accounts within the general ledger based on the risk of material misstatement values of the plurality of accounts for the entity being above a predetermined threshold.

Embodiments further include conducting further analysis on one or more of the accounts within the general ledger based on the risk of material misstatement values of the plurality of accounts for the entity being above a predetermined threshold.

In accordance with another aspect of the present invention, there is provided a computing system including a data input interface and a processing apparatus coupled to the data input interface. The processing apparatus is operable to receive a data set for an entity where the data set includes a plurality of data entries including values associated with a plurality of criterions. Each of the data entries are grouped into one of a plurality of groupings. Also, to generate an error probability for each of the groupings by analysing the data entries within each of the groupings. The error probability includes an ensemble of algorithms that each provide an indication of a potential error within the particular grouping. Then generate a flow metric for each grouping by evaluating a magnitude of values within at least one of the criterions for the data entries of each grouping. Also, determine a materiality factor for each grouping using the flow metric for the particular grouping, a planned materiality threshold, and a performance materiality, and generate a risk of material error for each of the groupings using the error probability of the particular one of the groupings and the materiality factor for the particular one of the groupings. Then to highlight one or more of the groupings within the data set based on the risk of material error of the plurality of groupings being above a predetermined threshold.

In accordance with another aspect of the present invention, there is provided a non-transitory computer-readable media containing a program element executable by a computing system to perform a method for highlighting risks of material error. The computer-readable media includes:

A first program code for receiving a data set for an entity, the data set includes a plurality of data entries including values associated with a plurality of criterions. Each of the data entries are grouped into one of a plurality of groupings.

A second program code for generating an error probability for each of the groupings by analysing the data entries within each of the groupings. The error probability includes an ensemble of algorithms that each provide an indication of a potential error within the particular grouping.

A third program code for generating a flow metric for each grouping by evaluating a magnitude of values within at least one of the criterions for the data entries of each grouping.

A fourth program code for determining a materiality factor for each grouping using the flow metric for the particular grouping, a planned materiality threshold, and a performance materiality.

A fifth program code for generating a risk of material error for each of the groupings using the error probability of the particular one of the groupings and the materiality factor for the particular one of the groupings.

Also, a sixth program code for highlighting one or more of the groupings within the data set based on the risk of material error of the plurality of groupings being above a predetermined threshold.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

Embodiments of the present invention provides methods, apparatus, and computer readable media to evaluate a risk of material misstatement (RMM) of financial accounts, financial statements, or other groupings of data entries, while taking into account the materiality of financial accounts of interest. Embodiments utilize combinations of quantitative and qualitative factors to produce robust and repeatable estimates of RMM based on computer implements evaluations of individual entries in a data set of general ledger entries while allowing for experience based qualitative input from auditors, regulators, and other parties. Embodiments may serve to highlight accounts or entries to auditors, financial regulators, or other personnel thereby enabling them to more efficiently, quickly, and accurately verify entries and accounts with a higher RMM.

Embodiments include an aggressive approach, a moderate approach, and a conservative approach. An aggressive approach puts an emphasis on qualitative, computer-based risk estimates with some qualitative input. A moderate approach incorporates theoretical, primarily qualitative risk estimation approaches with the mainly quantitative aggressive approach. A conservative approach may also be used that includes traditional risk assessment with limited quantitative input.

In embodiments, a Risk of Material Misstatement (RMM) is the likelihood that a misstatement may have a material impact on aggregate account data, a financial statement, an assertion level statement, class of transactions, or other financial measure, whether due to fraud, error, or other error source. RMM may be expressed as a percentage and calculations of RMM may take into account both the likelihood of a misstatement and a magnitude of an impact of a misstatement.

In embodiments, a risk probability is a quantitative value, which in most cases, may be expressed as a percentage less than 100%. A risk score may be determined by the use of an ensemble of algorithms or analytics which may also be referred to as "control points." Control points may be used to evaluate and provide a weighted score of risk of underlying transactions and entries and be grouped, aggregated, or presented by account to provide a risk score for an account. Transactions with higher risk scores are more likely to be of interest during audit scenarios.

In embodiments, control points are computer implemented algorithms and methods to quantitatively provide a risk probability for financial data. Each control point may be selected to provide accurate results for each particular type of financial data and may be broadly classified as "rule based", "statistical," or "machine learning" types. An example of a rule based control point is a Manual Entry Transaction. An example of a statistical control point is Benford's Law Test. An example of a machine learning control point is Rare Flow.

A manual entry control point may lead to an increased risk associated with transactions that have been entered by manual intervention. Transactions completed through manual entry could have a greater likelihood of misstatement either through intentional or accidental entry. The manual entry control point is an efficient way to allocate risk to the appropriate areas when facing a data file that has a significant number of batched entries to differentiate lower risk batched entries from manual entries. This is especially relevant for industries that have higher volumes of batched postings, such as retail locations or banks that will have nightly closings which update automatically at the same time.

A Benford's Law Test control point is based on Benford's Law that is based on an observation that the wear on each page within a book isn't evenly distributed and that pages beginning with the digit 1 were more worn than pages beginning with digits 2-9. Given the complexity of general ledger data, all entries may be analyzed within a two-digit distribution of Benford's Law. The observed counts of the first two digits in the general ledger may be computed against the expected counts of the first two digits using the Benford probability. If the difference between the observed and expected counts is found to be significant, the Benford's control point is triggered. Although the full analysis of the general ledger will provide a greater likelihood of returning false positives, the application of Benford's Law, in conjunction with the ensemble of other control points, still provides a meaningful analysis and risk profile. Benford's Law can provide insight into anomalous patterns of entry and transaction data, which can represent falsification of accounting data.

A Rare Flow control point is related by the movement of funds between two or more accounts, such as cash leaving an account to an expense account. A rare flow is an assessment of how common a flow between different accounts is. A rare flow does not analyze the amount of money flowing between accounts; it examines the frequency of occurrence of the flow relative to all of the other flows in a set of data. Using a simple example, a general ledger contains transactions with a single debit entry and a single credit entry. Each flow, or the direction money is moving, is analyzed, grouped, and scored based on their rarity in comparison to all of the other flows. If money flowing from one account to another account is unusual within a ledger, then flows between these accounts are given a higher risk score. In contrast, if money flowing from an account to another account is common within a ledger, then flows between these accounts are given a lower risk score.

Embodiments may utilize other, traditional risk factors such as inherent risk (IR) factors and control risk (CR) factors. Inherent risk may be defined as the risk of a material misstatement in a company's financial statements without considering internal financial controls. Control risk may be defined as the risk of a material misstatement in a company's financial statements due to a lack of relevant or adequate internal controls that could mitigate that particular risk or the risk that those internal controls may fail to identify the risk. Inherent risk is related to the nature of a business operation or transaction in the absence of internal controls to account for the risk. Control risk may be caused by inadequate internal controls in place to prevent and detect fraud and error. In many audits, IR and CR may be estimated as high, medium, or low risk on a business, account, entry, or other level. In embodiments, both IR and CR may be determined qualitatively by an auditor, accountant, service provider, or may be determined based on firm or company standards, or other means. Both IR and CR are typically expressed as percentages Embodiments utilize values for monetary flows or a flow metric which may be based on an amount of activity or volume of transactions in an account. Monetary flow may represent a net activity in an account and be an absolute value of the amount or value of in the account. Generally, the higher the flow, the higher the risk score will be. Monetary flows are expressed as a currency amount, such as dollar amount. A few large value transactions in an account may have the same monetary flow value as a large number of smaller value transactions in an account. As an absolute value or a net value is used, flows both into and out of an account may both be counted.

Embodiments utilize a planning materiality value to determine a threshold figure before any kind of reduction for performance materiality, tolerable misstatement, nominal thresholds, etc. becomes relevant to an audit. Typically, planning materiality is a value determined for an entity and may be determined by an auditor, an accountant, a regulator, etc. Planning materiality may be used to compare the monetary flows for an account to the planning materiality of an entity. For example, to determine how much higher are the flows in a particular account relative to the planning materiality for the entity. If the flows are low relative to the planning materiality, the risk will be lower. If the flows are high relative to the planning materiality, the risk be higher. In an embodiment planning materiality represents an amount prior to any reduction for performance materiality, tolerable misstatement, nominal thresholds, etc.

Embodiments utilize a transaction factor that may be derived from a performance materiality percentage of planning materiality to take into account risk that is not covered by performance materiality with full population risk scoring. In embodiments, the transaction factor may be defined as 1 minus the performance materiality percentage of planning materiality. If performance materiality is value between 0 and 1, so is the transaction factor. In embodiments, the transaction factor is expected to be between 10% and 75% for best results. A transaction factor may be determined for each entity that a RMM is being calculated for. Other embodiments may use appropriate alternatives to a transaction factor to calibrate a risk probability scaled by a materiality factor.

The use of a transaction factor provides the ability to handle the potential for distortion in the aggregation of high-volume accounts when risk assessment is being determined at the per-transaction level and then aggregated. While other approaches may have policies around handling high-risk transactions, use of a transaction factor may be used to handle the dilutive effectiveness of high-volume routine transactions in major accounts such as revenue.

In embodiments, a transaction factor between 25 and 33% may be used to indicate a normal amount of risk. Transaction factor values between 33 and 50% may represent high risk but may lead to very high RMM values. Excessively high risks may have a transaction factor between 50% and 75% but may lead to RMM values approaching or even exceeding 100%. Low risk transactions may use a transaction factor between 10 and 25%.

Embodiments provide a risk assessment that is the transactional risk represented by the actual activity from the current period and not an assumption or theoretical judgment of what occurred during the current period.

Figure 1:
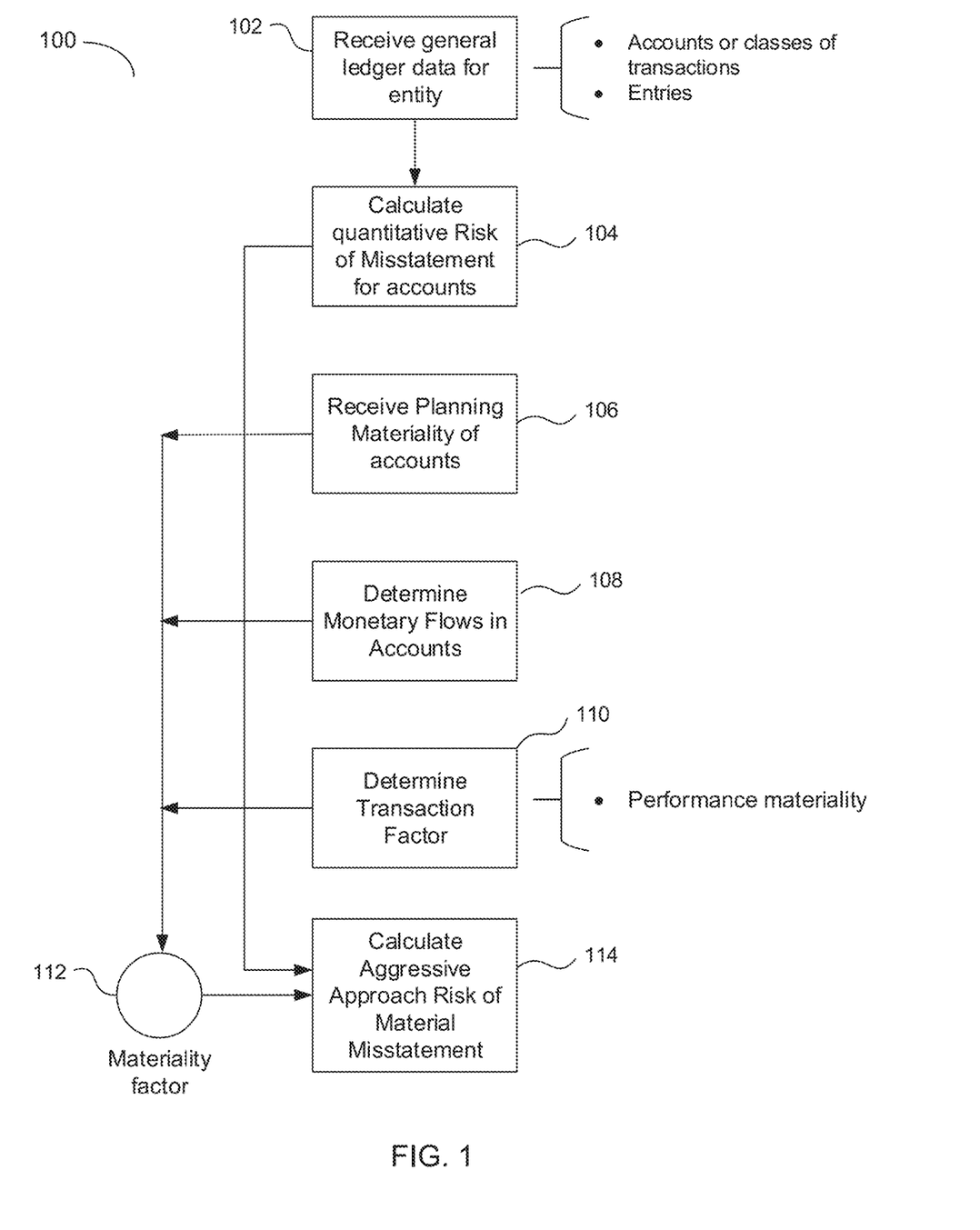
FIG. 1 illustrates a method of an aggressive approach to calculate a risk of material misstatement, according to an embodiment.

FIG. 1 illustrates a method 100 of an aggressive approach to calculate a risk of material misstatement, according to an embodiment. In step 102 a general ledger for an entity is received. The general ledger data includes a plurality of data entries organized into a plurality of accounts, classes of transactions, or other groupings of entries. In step 104, a quantitative risk of misstatement is generated for the accounts. This involves analyzing the data entries within each of the accounts. The risk of misstatement value is determined using an ensemble of control points that each provide an indication of potential risk of misstatement within each particular account. In step 106, a materiality factor for each account is received or determined using the total of monetary flows within the particular account. In step 108 a total of monetary flow is determined for each of the accounts. In step 110 a transaction factor is determined based on a planned materiality threshold for the entity and a performance materiality. In step 112 the values from steps 104, 106, 108, and 110 are combined to obtain a materiality factor for each account so that in step 114, a RMM value may be generated for each of the accounts using the risk of misstatement of each account and the materiality factor for the account. The determination of the RMM value of step 114 may be considered to be an aggressive approach. When using this approach, an auditor should determine if the data set appropriately fits the risk scoring elements (the control points) used in the determination of the risk of misstatement value (error probability). This determination may be based on the auditors understanding of the accounting system and process and may be determined after the calculation of the risk of misstatement value is complete and visibility is established into internal processes. Additionally, this approach may be beneficial for less complex entities.

Figure 2:
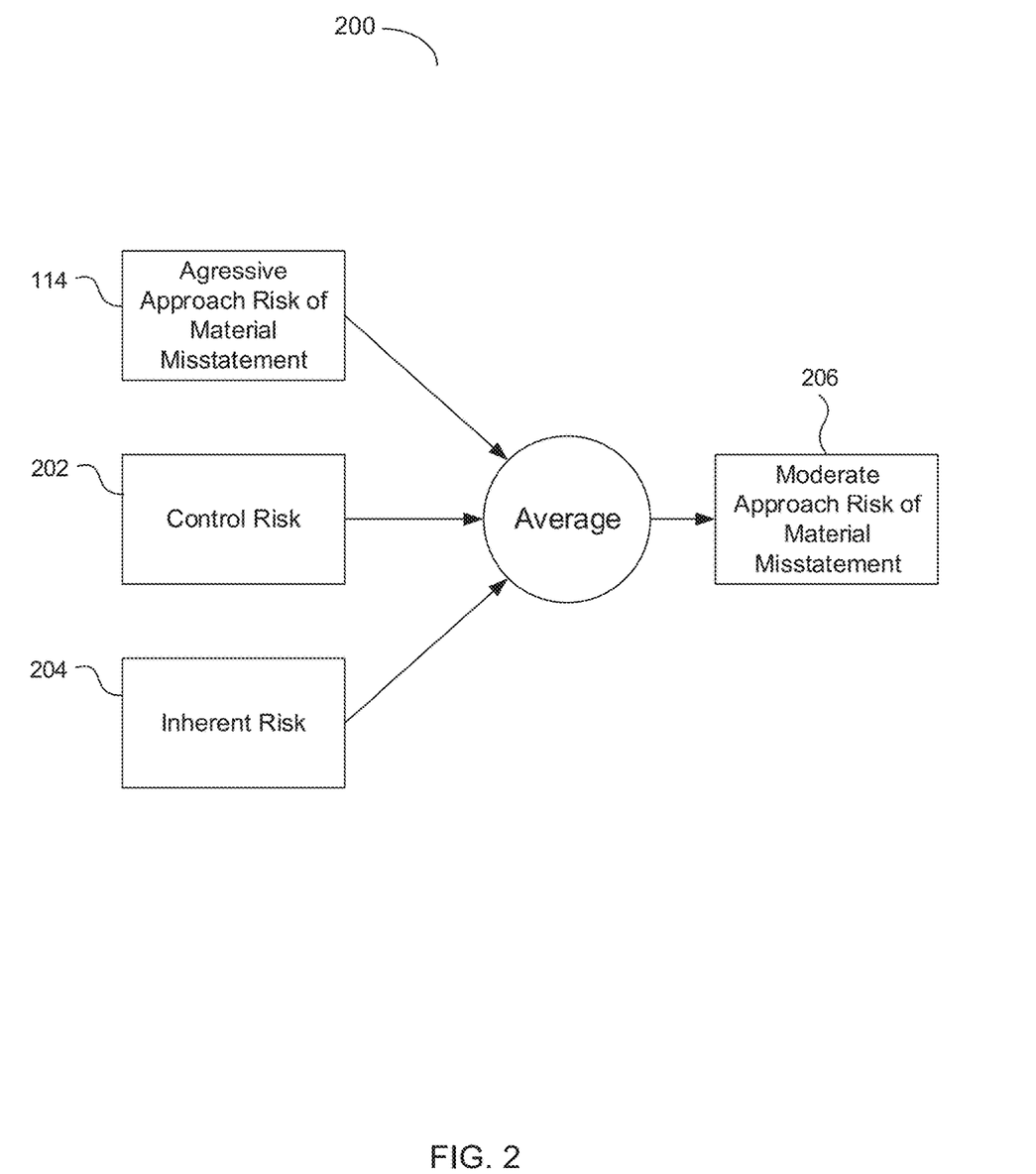
FIG. 2 illustrates additional steps to be applied to a method of the aggressive approach to provide a moderate approach to calculate a risk of material misstatement, according to an embodiment.

FIG. 2 illustrates additional steps 200 to be applied to a method of the aggressive approach to provide a moderate approach to calculate a risk of material misstatement, according to an embodiment. The moderate approach leverages an equal weight between theoretical and actual risk of misstatement by averaging the scores relative to these areas. The RMM values 114 obtained by the aggressive approach of FIG. 1 are averaged with a control risk (CR) 202 and an inherent risk (IR) 204 for the account to produce a moderate risk of material misstatement 206. The average of the risk scoring allows for the influencing of the RMM calculation by traditional risk formulas that are based on CR 202 and IR 204. However, the moderate RMM 206 has the advantage that its value includes risk based on transactional details. The moderate RMM value 206 represents the interplay between CR 202 and IR 204 and is compared to the monetary flow within the accounts relative to the planning materiality to provide a quantitative RMM assessment of a likelihood and magnitude.

The moderate approach provides an auditor an opportunity to support their professional judgment with an unbiased actual risk of misstatement score to create a score that better represents the risk of material misstatement by leveraging actual data in a current period.

Embodiments may combine the aggressive RMM approach or the moderate RMM approach with a conservative approach as a situation may dictate. The conservative approach continues to leverage traditional risk assessment procedures around prior knowledge of an auditor, a client and industry best practice as well as discussions with management or key personnel, and changes from the prior period.

In embodiments, aggressive RMM values 114 or moderate RMM values 206 may be used to bring data earlier into the audit process which allows an auditor to gain more visibility to clients data for the current period. Aggressive RMM values 114 or moderate RMM values 206 provide the ability to identify inconsistencies, unusual transactions or events, and amounts ratios and trends that indicate matters that may have audit implications. Unusual or unexpected relationships that are identified may assist an auditor in identifying risks of material misstatement, especially risks of material misstatement due to fraud.

Figure 3A:
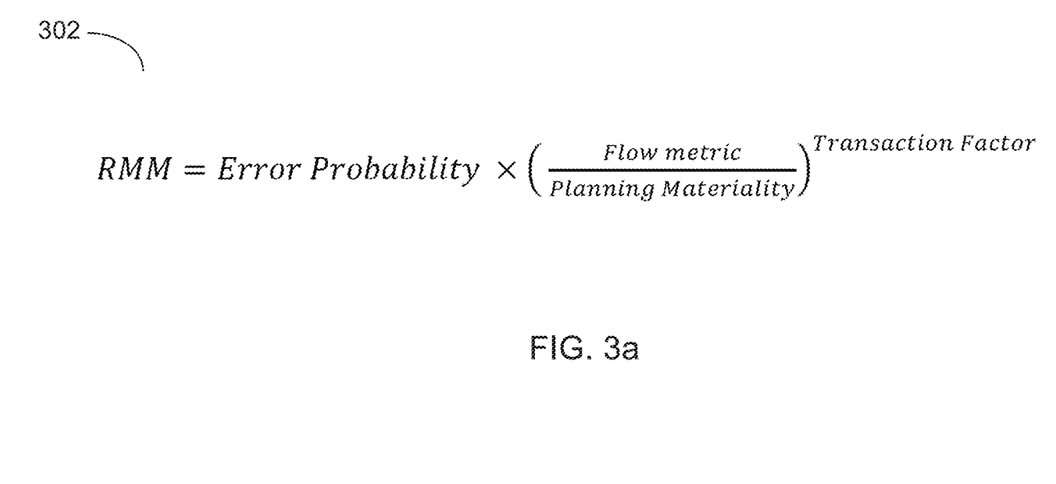
FIG. 3a illustrates a formula to calculate a risk of material misstatement using an aggressive approach, according to an embodiment.

FIG. 3a illustrated a formula 302 to calculate a risk of material misstatement using an aggressive approach, according to an embodiment.

$$RMM = \text{Error Probability} \times \left(\frac{\text{Flow metric}}{\text{Planning Materiality}}\right)^{\text{Transaction Factor}}$$

A materiality factor is calculated as a ratio of a flow metric for an account and a planning materiality for the entity or representative ledger being audited. As illustrated flow metric is divide by planning materiality. A transaction factor for the entity or representative ledger being audited is calculated as 1−performance materiality % of planning materiality, and the ratio of the flow metric to the planning materiality is raised to the power of the transaction factor. This scaling factor is applied to the error probability for the account or class of transactions to obtain an RMM value 114 using the aggressive approach. This aggressive RMM value 114 is calculated on a per account basis.

Figure 3B:
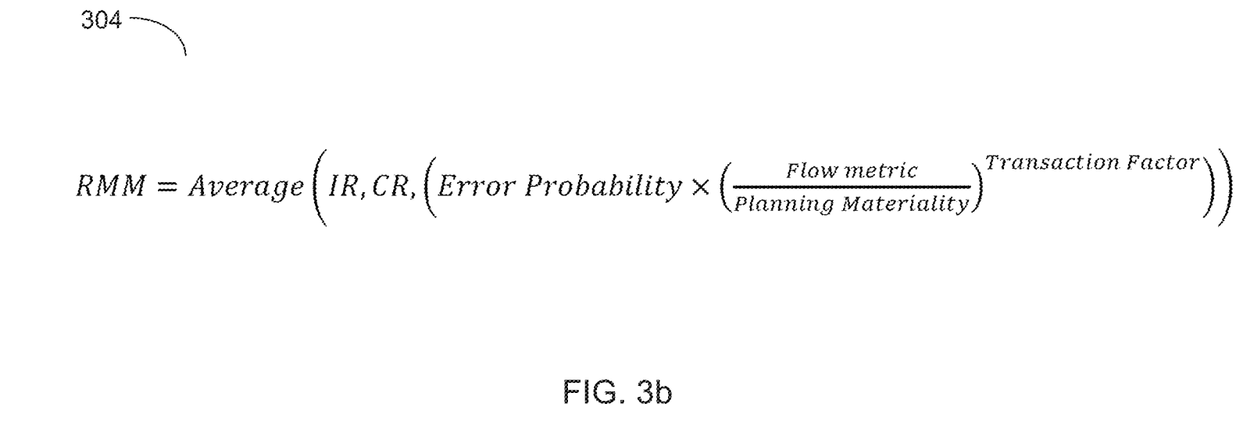
FIG. 3b illustrates a formula to calculate a risk of material misstatement using a moderate approach, according to an embodiment.

FIG. 3b illustrates a formula to calculate a risk of material misstatement using a moderate approach, according to an embodiment.

$$RMM = \text{Average}$$
$$\left(IR, CR, \left(\text{Error Probability} \times \left(\frac{\text{Flow metric}}{\text{Planning Materiality}}\right)^{\text{Transaction Factor}}\right)\right)$$

The RMM value 206 calculated using the moderate approach is an average of the IR, the CR, and the aggressive approach RMM value 114. This moderate RMM value 206 is calculated on a per account or class of transaction basis.

Figure 4:
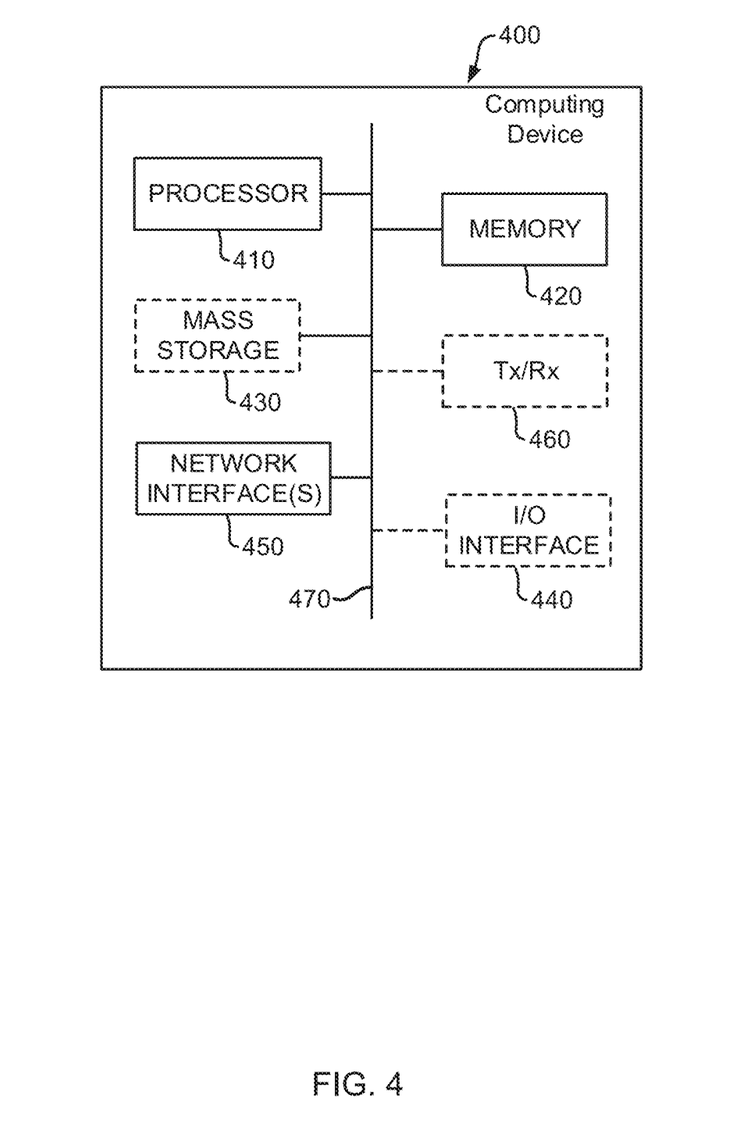
FIG. 4 illustrates a computing device that may be used to perform any of the methods as described herein, according to embodiments.

FIG. 4 illustrates a block diagram of a computing device 400 that may be used for implementing methods disclosed herein. In particular, network RMM may be determined using methods implements on one or more computing systems 400. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 400 includes a processor or central processing unit (CPU) 410, a bus 470, a memory 420, and a network interface 450, and may optionally also include a mass storage device 430, a receiver/transmitter 460, and an I/O interface 440 (shown in dashed lines).

The processor 410 may comprise any type of electronic data processor. The memory 420 may comprise any type of non-transitory system memory such as static random access memory (SRAM), dynamic random access memory (DRAM), synchronous DRAM (SDRAM), read-only memory (ROM), or a combination thereof. In an embodiment, the memory 420 may include ROM for use at boot-up, and DRAM for program and data storage for use while executing programs. The bus 470 may be one or more of any type of several bus architectures including a memory bus or memory controller, a peripheral bus, or a video bus.

The mass storage 430 may comprise any type of non-transitory storage device configured to store data, programs, and other information and to make the data, programs, and other information accessible via the bus 470. The mass storage 430 may comprise, for example, one or more of a solid-state drive, hard disk drive, a magnetic disk drive, or an optical disk drive.

The I/O interface 440 provide optional interfaces to couple external input and output devices to the processor 410. Examples of input and output devices include a display coupled to and an I/O device such as a touchscreen coupled to the I/O interface 440. Other devices may be coupled to the processor 410, and additional or fewer interfaces may be utilized. For example, a serial interface such as Universal Serial Bus (USB) (not shown) may be used to provide an interface for an external device.

The processor 410 may also include one or more network Tx/Rx interfaces 460, which may comprise wired links, such as an Ethernet cable, or wireless links to access one or more networks. The Tx/Rx interface 460 allow the processor 410 to communicate with remote entities via the networks. For example, the Tx/Rx interfaces 460 may provide communication to remote computers, servers, cloud computing resources, etc.

Actions associated with methods described herein can be implemented as coded instructions in a computer program product. In other words, the computer program product is a computer-readable medium upon which software code or instructions is recorded to execute the method when the computer program product is loaded into memory and executed on a processor of a computing device.

Further, each operation of the method may be executed on any real or virtual computing device, such as a personal computer, server, tablet, smartphone, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Unless defined otherwise, all technical and scientific terms used herein have the same meaning as commonly understood by one of ordinary skill in the art to which this invention belongs.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method comprising:
   receiving a data set for an entity, the data set including a plurality of data entries including values associated with a plurality of criterions, each of the data entries being grouped into one of a plurality of groupings;
   generating an error probability for each of the groupings by analysing the data entries within each of the groupings, the error probability including an ensemble of algorithms that each provide an indication of a potential error within the particular grouping;
   generating a flow metric for each grouping by evaluating a magnitude of values within at least one of the criterions for the data entries of each grouping;
   determining a materiality factor for each grouping using the flow metric for the particular grouping, a planned materiality threshold, and a performance materiality;
   generating a risk of material error for each of the groupings using the error probability of the particular one of the groupings and the materiality factor for the particular one of the groupings; and
   highlighting one or more of the groupings within the data set based on the risk of material error of the plurality of groupings being above a predetermined threshold.

2. The method of claim 1 further comprising generating a visual rendition of the groupings that are highlighted.

3. The method of claim 2 wherein the highlighted group is obtained through a technique including one of:
   sorting based on the risk of material error for each of the groupings,
   filtering,
   colouring or other formatting, or
   receiving a click through a user interface.

4. The method of claim 2 further comprising conducting further analysis on data entries within groupings that are highlighted.

5. The method of claim 1 wherein the materiality factor is a ratio of the flow metric and the planned materiality threshold raised to the power of one minus the performance materiality.

6. The method of claim 5 wherein the risk of material error is the error probability scaled by the materiality factor.

7. The method of claim 5 wherein the risk of material error is an average of the error probability scaled by the materiality factor, a control risk of the particular one of the groupings, and the inherent risk of the particular one of the groupings.

8. The method of claim 1 wherein the error probability is a quantitative value calculated based on individual error probabilities of each of the data entries within the particular grouping.

9. The method of claim 1 wherein the data set is a general ledger and the plurality of groupings are financial accounts.

10. A computer implement method comprising:
    receiving a general ledger for an entity, the general ledger including a plurality of data entries associated with a plurality of accounts;
    generating a risk of misstatement value for each of the accounts by analysing the data entries within each of the accounts, the risk of misstatement value comprising an ensemble of control points that each provide an indication of potential risk of misstatement within the particular account;

determining a total of monetary flow within each of the accounts;

determining a materiality factor for each account using the total of monetary flows within the particular account, a planned materiality threshold for the entity, and a performance materiality; and generating a risk of material misstatement value for each of the accounts using the risk of misstatement of the particular one of the accounts and the materiality factor for the particular one of the accounts.

11. The method of claim 10 wherein the materiality factor is a ratio of the total of monetary flows within the particular account and the planned materiality threshold for the entity raised to the power of one minus the performance materiality.

12. The method of claim 11 wherein the risk of material misstatement value for each of the accounts is the risk of misstatement of the particular one of the accounts multiplied by the materiality factor for the particular one of the accounts.

13. The method of claim 11 wherein the risk of material misstatement value for each of the accounts is an average of the risk of misstatement of the particular one of the accounts multiplied by the materiality factor for the particular one of the accounts, a control risk for the particular one of the accounts, and the inherent risk for the particular one of the accounts.

14. The method of claim 10 wherein the error probability is a quantitative value calculated based on individual error probabilities of each of the data entries within the particular grouping.

15. The method of claim 10 further comprising:
highlighting one or more of the accounts within the general ledger based on the risk of material misstatement values of the plurality of accounts for the entity being above a predetermined threshold.

16. A method according to claim 4 further comprising:
conducting further analysis on one or more of the accounts within the general ledger based on the risk of material misstatement values of the plurality of accounts for the entity being above a predetermined threshold.

17. A computing system comprising:
a data input interface and a processing apparatus coupled to the data input interface, the processing apparatus operable to:
receive a data set for an entity, the data set including a plurality of data entries including values associated with a plurality of criterions, each of the data entries being grouped into one of a plurality of groupings;

generate an error probability for each of the groupings by analysing the data entries within each of the groupings, the error probability including an ensemble of algorithms that each provide an indication of a potential error within the particular grouping;

generate a flow metric for each grouping by evaluating a magnitude of values within at least one of the criterions for the data entries of each grouping;

determine a materiality factor for each grouping using the flow metric for the particular grouping, a planned materiality threshold, and a performance materiality;

generate a risk of material error for each of the groupings using the error probability of the particular one of the groupings and the materiality factor for the particular one of the groupings; and highlight one or more of the groupings within the data set based on the risk of material error of the plurality of groupings being above a predetermined threshold.

18. A non-transitory computer-readable media containing a program element executable by a computing system to perform a method for highlighting risks of material error, the computer-readable media comprising:

first program code for receiving a data set for an entity, the data set including a plurality of data entries including values associated with a plurality of criterions, each of the data entries being grouped into one of a plurality of groupings;

second program code for generating an error probability for each of the groupings by analysing the data entries within each of the groupings, the error probability including an ensemble of algorithms that each provide an indication of a potential error within the particular grouping;

third program code for generating a flow metric for each grouping by evaluating a magnitude of values within at least one of the criterions for the data entries of each grouping;

fourth program code for determining a materiality factor for each grouping using the flow metric for the particular grouping, a planned materiality threshold, and a performance materiality;

fifth program code for generating a risk of material error for each of the groupings using the error probability of the particular one of the groupings and the materiality factor for the particular one of the groupings; and sixth program code for highlighting one or more of the groupings within the data set based on the risk of material error of the plurality of groupings being above a predetermined threshold.

* * * * *